(12) United States Patent
Zhou

(10) Patent No.: US 11,063,962 B2
(45) Date of Patent: Jul. 13, 2021

(54) MALICIOUS URL DETECTION METHOD AND APPARATUS, TERMINAL, AND COMPUTER STORAGE MEDIUM

(71) Applicant: TENCENT TECHNOLOGY (SHENZHEN) COMPANY LIMITED, Guangdong (CN)

(72) Inventor: Qiang Zhou, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 544 days.

(21) Appl. No.: 15/979,667

(22) Filed: May 15, 2018

(65) Prior Publication Data
US 2018/0262522 A1  Sep. 13, 2018

Related U.S. Application Data

(63) Continuation of application No. PCT/CN2017/094425, filed on Jul. 26, 2017.

(30) Foreign Application Priority Data

Aug. 4, 2016  (CN) .......................... 201610635742.0

(51) Int. Cl.
| | | |
|---|---|---|
| *G06F 21/56* | (2013.01) | |
| *H04L 29/06* | (2006.01) | |
| *G06F 16/11* | (2019.01) | |
| *G06F 16/955* | (2019.01) | |
| *G06F 9/455* | (2018.01) | |

(52) U.S. Cl.
CPC ...... *H04L 63/1416* (2013.01); *G06F 9/45558* (2013.01); *G06F 16/128* (2019.01);
(Continued)

(58) Field of Classification Search
CPC ............. H04L 63/1416; H04L 63/1483; H04L 63/1466; G06F 16/9566; G06F 21/563;
(Continued)

(56) References Cited

U.S. PATENT DOCUMENTS

| | | | |
|---|---|---|---|
| 2009/0249119 A1* | 10/2009 | Sethumadhavan | .......................... G06F 11/1469 714/15 |
| 2011/0167195 A1* | 7/2011 | Scales | ................. G06F 11/2038 711/6 |

(Continued)

FOREIGN PATENT DOCUMENTS

| | | |
|---|---|---|
| CN | 102088379 A | 6/2011 |
| CN | 102254111 A | 11/2011 |
| CN | 103617390 A | 3/2014 |
| CN | 103763316 A | 4/2014 |
| CN | 106789866 A | 5/2017 |

OTHER PUBLICATIONS

Communication dated Jun. 19, 2019, from the State Intellectual Property Office of the P.R.C. in counterpart application No. 201610635742.0.

(Continued)

*Primary Examiner* — Farid Homayounmehr
*Assistant Examiner* — Suman Debnath
(74) *Attorney, Agent, or Firm* — Sughrue Mion, PLLC

(57) ABSTRACT

A malicious URL detection method, apparatus, and storage medium are provided. The method includes rolling back a virtual machine to an initiating state in response to detecting a trigger event of the virtual machine. In the initiating state, page content of a target URL is loaded using the virtual machine. Using the virtual machine, an application program linked to the page content is run. A system snapshot file of the virtual machine is obtained in at least one state of the initiating state, a state in which the loading of the page content is completed, or a state in which the application program is being run. Malicious URL detection is performed on the target URL based on the obtained system snapshot file.

25 Claims, 6 Drawing Sheets

(52) U.S. Cl.
CPC ........ *G06F 16/9566* (2019.01); *G06F 21/563*
(2013.01); *H04L 63/1483* (2013.01); *G06F
2009/4557* (2013.01); *G06F 2009/45587*
(2013.01)

(58) Field of Classification Search
CPC ............... G06F 16/128; G06F 9/45558; G06F
2009/4557; G06F 2009/45587; G06F
63/1466
See application file for complete search history.

(56) References Cited

U.S. PATENT DOCUMENTS

| | | | |
|---|---|---|---|
| 2012/0072968 A1 | 3/2012 | Wysopal et al. | |
| 2014/0149492 A1* | 5/2014 | Ananthanarayanan | ..................... G06F 9/5072 709/203 |
| 2018/0152470 A1* | 5/2018 | Lu | ....................... H04L 63/1433 |
| 2019/0317948 A1* | 10/2019 | Marsden | ............... G06F 16/214 |

OTHER PUBLICATIONS

Written Opinion of the International Searching Authority dated Oct. 20, 2017, in counterpart International Application No. PCT/CN2017/094425.

International Search Report of PCT/CN2017/094425 filed Oct. 20, 2017.

Communication dated Mar. 20, 2019 from the State Intellectual Property Office of the P.R.C. in counterpart Application No. 201610635742.0.

\* cited by examiner

MALICIOUS URL DETECTION METHOD AND APPARATUS, TERMINAL, AND COMPUTER STORAGE MEDIUM

CROSS-REFERENCE TO RELATED APPLICATIONS

This application is a continuation of International Patent Application No. PCT/CN2017/094425 filed Jul. 26, 2017, which claims priority from Chinese Patent Application No. 201610635742.0, filed with the Chinese Patent Office on Aug. 4, 2016 and entitled "MALICIOUS URL DETECTION METHOD AND APPARATUS", the disclosures of each of which are incorporated by reference herein in their entirety.

BACKGROUND

1. Field

This application relates to the field of Internet technologies, and in particular, to a malicious URL detection method and apparatus.

2. Description of Related Art

Rapid development of an Internet technology brings growing convenience to people's life. For example, people may download various materials, various players, and the like by using the Internet. In addition, a malicious Uniform Resource Locator (URL) has created growing damage on the Internet. For example, various Trojan horse viruses are disguised as normal files, so as to be wantonly spread, a phishing website simulates a normal website to steal an account number and a password of a user, and so on. Therefore, a malicious URL detection method is widely followed with interest.

A related art malicious URL detection method is provided, and the method is mainly static characteristic detection. That is, code of a web page corresponding to a to-be-detected target URL is downloaded by using a cloud security server, and a static analysis is performed on the downloaded code, to determine whether the web page includes a specified behavior characteristic, and when the web page includes the specified behavior characteristic, determine the target URL as a malicious URL. For example, the specified behavior characteristic is <iframe src=url display=none>, and when it is determined that code of the web page includes <iframe src=url display=none>, the target URL is determined as a malicious URL.

However, the cloud security server can perform a static analysis only on the code of the web page corresponding to the target URL, thereby determining whether the target URL is a malicious URL, but cannot determine other information linked to the web page, consequently causing malicious URL determining accuracy to be relatively low.

SUMMARY

It is an aspect to provide a malicious URL detection method and apparatus to resolve problems in the related art technology discussed above.

According to an aspect of one or more embodiments, there is provided a method. The method includes rolling back a virtual machine to an initiating state in response to detecting a trigger event of the virtual machine. In the initiating state, page content of a target URL is loaded using the virtual machine. Using the virtual machine, an application program linked to the page content is run. A system snapshot file of the virtual machine is obtained in at least one state of the initiating state, a state in which the loading of the page content is completed, or a state in which the application program is being run. Malicious URL detection is performed on the target URL based on the obtained system snapshot file.

According to other aspects of one or more embodiments, there is also provided an apparatus and a storage medium consistent with the method.

BRIEF DESCRIPTION OF THE DRAWINGS

Exemplary embodiments will be described below with reference to the drawings, in which.

DETAILED DESCRIPTION

Figure 1:
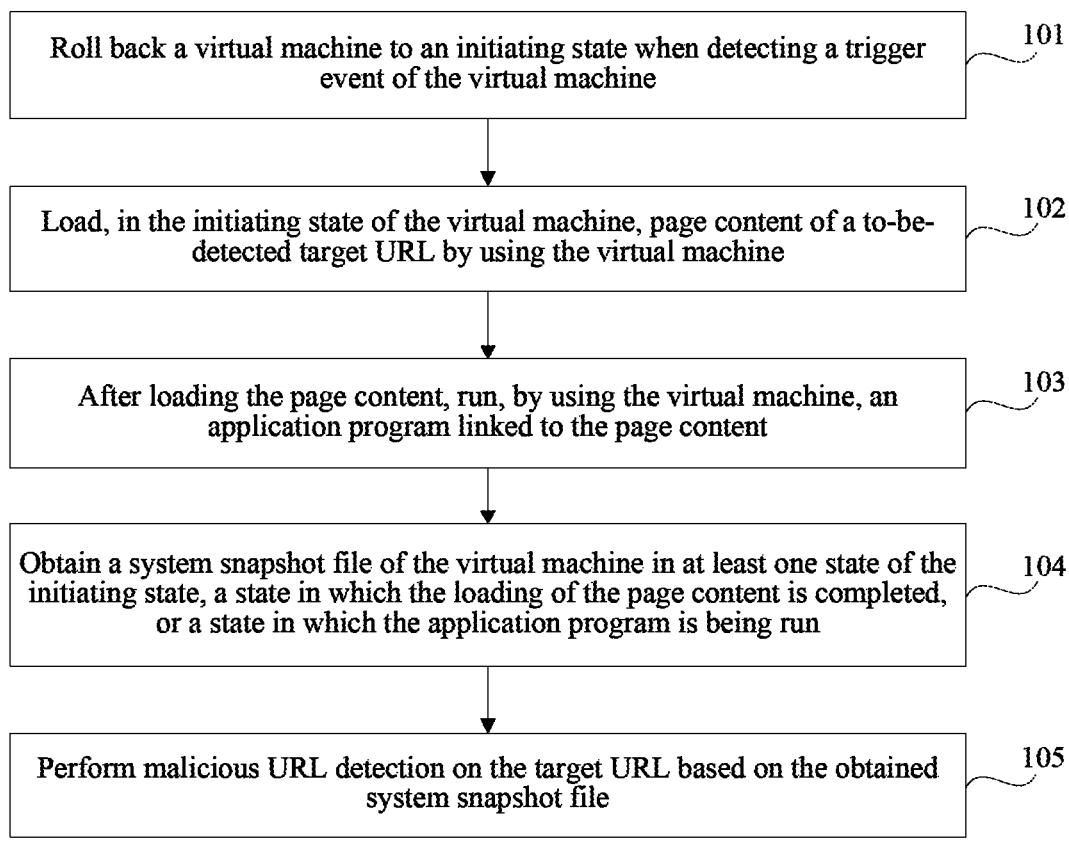
FIG. 1 is a flowchart of a malicious URL detection method according to an exemplary embodiment.

FIG. 1 is a flowchart of a malicious URL detection method according to an exemplary embodiment. As shown in FIG. 1, the malicious URL detection method is used in a terminal, and may include the following steps:

Step 101: Roll back a virtual machine to an initiating state when detecting a trigger event of the virtual machine.

Step 102: Load, in the initiating state of the virtual machine, page content of a to-be-detected target URL by using the virtual machine.

Step 103: After loading the page content, run, by using the virtual machine, an application program linked to the page content.

Step 104: Obtain a system snapshot file of the virtual machine in at least one state of the initiating state, a state in which the loading of the page content is completed, or a state in which the application program is being run.

Step 105: Perform malicious URL detection on the target URL based on the obtained system snapshot file.

The obtaining a system snapshot file of the virtual machine in at least one state of the initiating state, a state in which the loading of the page content is completed, or a state in which the application program is being run may include:

copying a system file of the virtual machine in the initiating state, to obtain a first system snapshot file;

copying a system file of the virtual machine in the state in which the loading of the page content is completed, to obtain a second system snapshot file; and copying a system file of the virtual machine in the state in which the application program is being run, to obtain a third system snapshot file.

Correspondingly, the performing malicious URL detection on the target URL based on the obtained system snapshot file may include:

performing malicious URL detection on the target URL based on the first system snapshot file, the second system snapshot file, and the third system snapshot file.

The performing malicious URL detection on the target URL based on the first system snapshot file, the second system snapshot file, and the third system snapshot file may include:

determining a security level of the page content based on the first system snapshot file and the second system snapshot file;

determining a security level of the application program based on the first system snapshot file and the third system snapshot file; and performing malicious URL detection on the target URL based on the security level of the page content and the security level of the application program.

The determining a security level of the page content based on the first system snapshot file and the second system snapshot file may include:

determining a first modification trace quantity based on the first system snapshot file and the second system snapshot file, where the first modification trace quantity is a modification trace quantity of the second system snapshot file relative to the first system snapshot file; and when the first modification trace quantity is greater than or equal to a first threshold, determining that the security level of the page content is malicious;

when the first modification trace quantity is less than the first threshold and greater than or equal to a second threshold, determining that the security level of the page content is risky; or when the first modification trace quantity is less than the second threshold, determining that the security level of the page content is secure.

The determining a security level of the application program based on the first system snapshot file and the third system snapshot file may include:

determining a second modification trace quantity based on the first system snapshot file and the third system snapshot file, where the second modification trace quantity is a modification trace quantity of the third system snapshot file relative to the first system snapshot file, where the second modification trace may be a modification trace generated by modifying a sensitive file or a registry;

when the second modification trace quantity is greater than or equal to a third threshold, determining that the security level of the application program is malicious;

when the second modification trace quantity is less than the third threshold and greater than or equal to a fourth threshold, determining that the security level of the application program is risky; or when the second modification trace quantity is less than the fourth threshold, determining that the security level of the application program is secure.

The performing malicious URL detection on the target URL based on the security level of the page content and the security level of the application program may include:

when both the security level of the page content and the security level of the application program are secure, determining that the target URL is a secure URL;

when at least one of the security level of the page content or the security level of the application program is risky, determining that the target URL is risky; or when at least one of the security level of the page content or the security level of the application program is malicious, determining that the target URL is a malicious URL.

The running, by using the virtual machine, an application program linked to the page content may include:

downloading an installation file of the application program based on a link in the page content by using the virtual machine;

installing the application program based on the installation file by using the virtual machine; and after the installation of the application program is completed, running the application program.

When the application program is a player, a security level of the player may be further determined according to a malicious behavior, such as creating a random service or loading a driver.

Before the copying a system file of the virtual machine in the state in which the application program is being run, the method further may include:

capturing, in a process of installing the application program, a first installation interface picture of the application program by using the virtual machine;

determining a similarity degree between the first installation interface picture and a pre-stored second installation interface picture of the application program by using the virtual machine, where the second installation interface picture is an installation interface picture when the application program is in a secure state; and when the similarity degree is greater than a similarity degree threshold, determining that the application program is a secure application program, and performing the step of copying a system file of the virtual machine in the state in which the application program is being run.

The first system snapshot file, the second system snapshot file, and the third system snapshot file are all obtained by copying the system file of the virtual machine by using a system snapshot tool.

All of the foregoing technical solutions may form an embodiment of this application according to any combination. Details about this are not described in a one by one manner herein in this embodiment of this application.

Figure 2A:
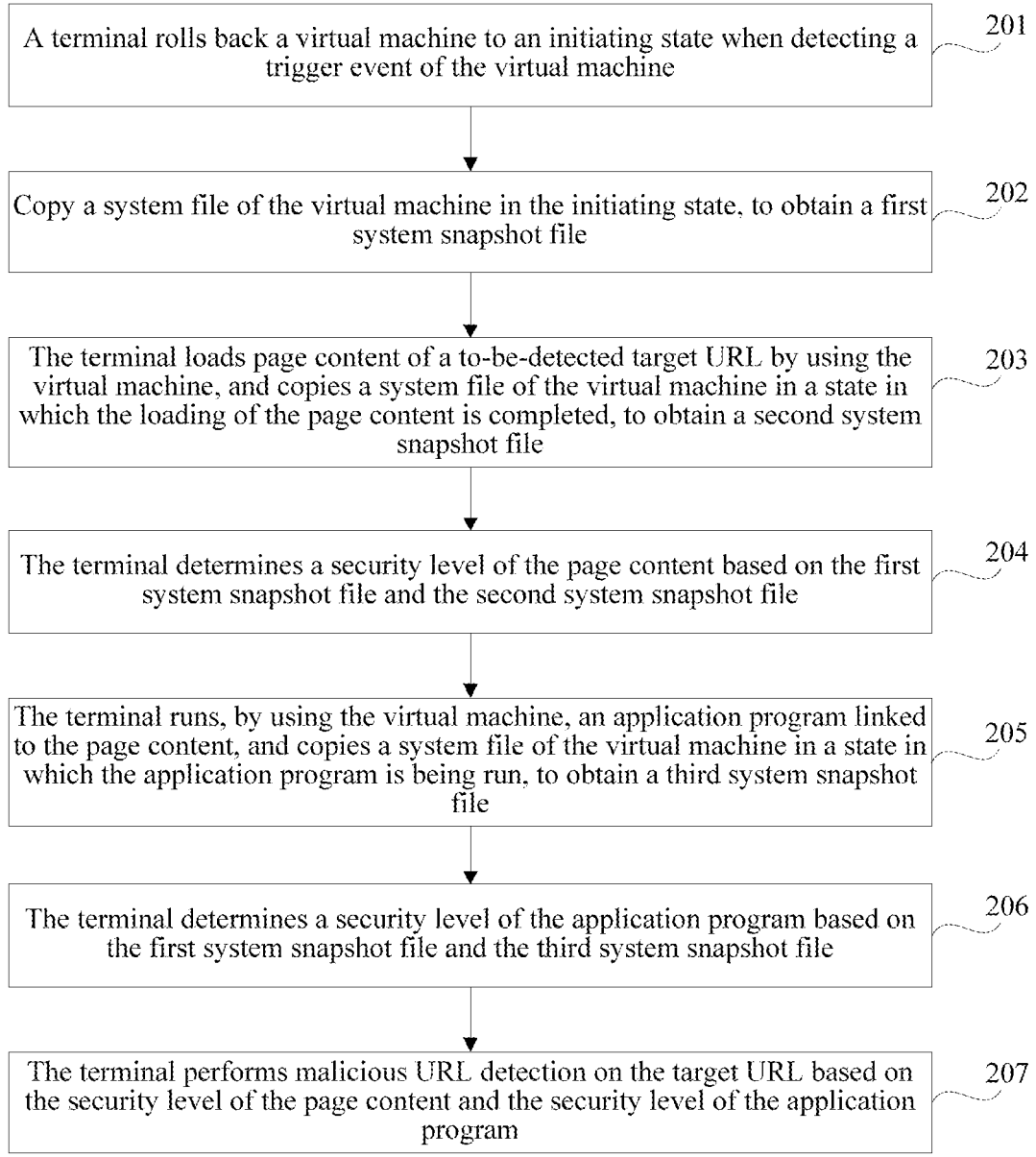
FIG. 2A is a flowchart of a malicious URL detection method according to an exemplary embodiment.

FIG. 2A is a flowchart of a malicious URL detection method according to an exemplary embodiment. As shown in FIG. 2A, the malicious URL detection method is used in a terminal, and may include the following steps:

Step 201: The terminal rolls back a virtual machine to an initiating state when detecting a trigger event of the virtual machine.

Currently, according to the malicious URL detection method, a static analysis is mainly performed on code of a web page corresponding to a target URL, to determine whether the target URL is a malicious URL, and other information linked to the web page cannot be determined, consequently causing malicious URL determining accuracy to be relatively low. In addition, directly running, on the terminal, the other information linked to the web page may pose a threat to an operating system of the terminal. However, when the other information linked to the web page is run on the virtual machine, the virtual machine is isolated from the operating system of the terminal on which the virtual machine is located, and therefore the operating system of the terminal is not affected. Therefore, to increase the malicious URL determining accuracy when the operating system of the terminal is not affected, in this embodiment of this application, the terminal rolls back the virtual machine to the initiating state when detecting the trigger event of the virtual machine.

In an implementation, an operation of rolling back, by the terminal, the virtual machine to the initiating state may be: the terminal may send a rollback command to the virtual machine, and when the virtual machine receives the rollback command, the virtual machine is rolled back to the initiating state, and sends rollback completion indication information to the terminal, where the rollback completion indication information is used for indicating that the virtual machine is already rolled back to the initiating state.

The virtual machine refers to a virtual system that is simulated by using software, has a function of a complete hardware system, and is run in a completely isolated environment. By using the virtual system, software may be independently installed and run, and data may be independently stored, without affecting the operating system of the terminal on which the virtual machine is currently located. That is, when the other information linked to the web page corresponding to the target URL is malicious information, running, on the virtual machine, the other information linked to the web page corresponding to the target URL does not affect the terminal on which the virtual machine is currently located, and the virtual machine may be Virtual Box, VMware, Virtual PC, or the like. This is not specifically limited in this embodiment of this application.

It should be noted that, a plurality of virtual machines may be installed on the terminal, and the virtual machine provided in this embodiment of this application may be any one of the plurality of virtual machines. This is not specifically limited in this embodiment of this application.

In addition, the trigger event of the virtual machine is used for instructing to roll back the virtual machine to the initiating state, and the trigger event of virtual machine may be triggered when a user runs a specified script by using the terminal, or certainly may be triggered in another manner in actual application. This is not specifically limited in this embodiment of this application.

The initiating state of the virtual machine refers to a state in which the virtual machine is not installed or prior to a state in which any application program is run, that is, an initialization secure environment after the virtual machine is installed.

In addition, the specified script is a series of events written by the user according to an actual requirement, in a format, and by using a particular descriptive language. That is, the specified script is a set of a plurality of events, and the plurality of events may include: invoking a system snapshot tool on the virtual machine, copying, by the system snapshot tool, a first system snapshot file, obtaining a link in page content, obtaining an installation file in an application program, capturing a first installation interface picture of the application program, copying, by the system snapshot tool, a second system snapshot file, copying, by the system snapshot tool, a third system snapshot file, comparing, by the system snapshot tool, the first system snapshot file with the second system snapshot file, and comparing, by the system snapshot tool, the first system snapshot file with the third system snapshot file.

It should be noted that, the particular descriptive language may be implemented by using the PHP language, or may be implemented by using the Ruby language or the Python language. This is not specifically limited in this embodiment of this application.

The system snapshot tool is SystemSnapshot. The SystemSnapshot is a system snapshot tool developed by Tencent, has functions of copying a system snapshot file and comparing different system snapshot files, and additionally has a high speed and high accuracy of comparing the different system snapshot files.

It is noteworthy that, the terminal provided in this embodiment of this application may be a mobile phone, a tablet computer, a desktop computer, an e-reader, or a personal digital assistant (PDA), or the like. This is not specifically limited in this embodiment of this application. When the terminal provided in this embodiment of this application is a computer device such as a tablet computer or a desktop computer, the virtual machine provided in this embodiment of this application may be a virtual machine installed on the terminal; or a terminal may be connected to a mobile phone, an e-reader, or a PDA, and the mobile phone, the e-reader, or the PDA connected to the terminal may be used as the virtual machine. When the terminal provided in this embodiment of this application is a mobile terminal such as a mobile phone, an e-reader, or a PDA, the virtual machine provided in this embodiment of this application may be a virtual machine installed on the terminal. This is not specifically limited in this embodiment of this application.

Step 202: Copy a system file of the virtual machine in the initiating state, to obtain a first system snapshot file.

When the terminal copies the system file of the virtual machine in the initiating state, to obtain the first system snapshot file, the terminal may invoke a system snapshot tool on the virtual machine, copy the system file of the virtual machine in the initiating state by using the system snapshot tool, and determine the system file of the virtual machine in the initiating state as the first system snapshot file.

In an implementation, an operation of copying, by the terminal, the system file of the virtual machine in the initiating state by using the system snapshot tool may be: the terminal sends a copying command to the virtual machine by using the system snapshot tool, and when receiving the copying command, the virtual machine copies a system file of the virtual machine in the initiating state, to obtain a first system snapshot file, and sends the first system snapshot file to the terminal.

It should be noted that, the system file may include a registry, a process, and a file, and the first system snapshot file is a dataset of a registry, a process, and a file. Certainly, in actual application, the system file may further include other data, and the first system snapshot file is a dataset of a registry, a process, a file, and other data. This is not specifically limited in this embodiment of this application.

The first system snapshot file may be stored in a local disk in a form of a .log file, or certainly may be stored in a form of another file in actual application. This is not specifically limited in this embodiment of this application.

Step 203: The terminal loads page content of a to-be-detected target URL by using the virtual machine, and copies a system file of the virtual machine in a state in which the loading of the page content is completed, to obtain a second system snapshot file.

Specifically, after the terminal rolls back the virtual machine to the initiating state, the terminal obtains the to-be-detected target URL by using the virtual machine, runs a browser by using the virtual machine, and loads the page content of the to-be-detected target URL in the browser. The terminal may invoke the system snapshot tool on the virtual machine, and the system snapshot tool copies the system file of the virtual machine in the state in which the loading of the page content is completed, and determines, as the second system snapshot file, the system file of the virtual machine in the state in which the loading of the page content is completed.

It should be noted that, when obtaining the to-be-detected target URL by using the virtual machine, the terminal may obtain the to-be-detected target URL by using a specified script, or certainly may obtain the to-be-detected target URL in another manner in actual application. This is not specifically limited in this embodiment of this application.

In addition, when running the browser by using the virtual machine, the terminal may alternatively run the browser by using a specified script, or certainly may run the browser in another manner in actual application, for example, clicking, by the user, a browser shortcut in a virtual machine interface. This is not specifically limited in this embodiment of this application.

In an implementation, an operation of loading, by the terminal, the page content of the to-be-detected target URL by using the virtual machine, and copying the system file of the virtual machine in the state in which the loading of the page content is completed may be: the terminal sends a loading command to the virtual machine, where the loading command carries the target URL; when receiving the loading command, the virtual machine obtains and loads the page content by using the target URL; after the virtual machine completes the loading, the virtual machine may send loading completion indication information to the terminal, where the loading completion indication information is used for indicating that the virtual machine already completes the loading of the page content; when receiving the loading completion indication information, the terminal may send a copying command to the virtual machine; when receiving the loading command, the virtual machine copies the system file of the virtual machine in the state in which the loading of the page content is completed, to obtain the second system snapshot file, and sends the second system snapshot file to the terminal.

When the system file includes a registry, a process, and a file, the second system snapshot file is a dataset of a registry, a process, and a file of a system of the virtual machine in the state in which the loading of the page content is completed. When the system file further includes other data, the second system snapshot file is a dataset of a registry, a process, a file, and other data of a system of the virtual machine in the state in which the loading of the page content is completed. This is not specifically limited in this embodiment of this application.

It should be noted that, the second system snapshot file may be stored in a local disk in a form of a .log file, or certainly may be stored in a form of another file in actual application. This is not specifically limited in this embodiment of this application.

Step 204: The terminal determines a security level of the page content based on the first system snapshot file and the second system snapshot file.

Specifically, the terminal may determine a first modification trace quantity based on the first system snapshot file and the second system snapshot file, where the first modification trace quantity is a modification trace quantity of the second system snapshot file relative to the first system snapshot file, and determine the security level of the page content based on the first modification trace quantity.

An operation of determining, by the terminal, the first modification trace quantity based on the first system snapshot file and the second system snapshot file may be: the terminal invokes the system snapshot tool, and compares the first system snapshot file with the second system snapshot file by using the system snapshot tool, to determine the first modification trace quantity.

It should be noted that, in this embodiment of this application, descriptions are provided by using only an example in which the terminal invokes the system snapshot tool, and compares the first system snapshot file with the second system snapshot file by using the system snapshot tool; or certainly, in actual application, the terminal may compare the first system snapshot file with the second system snapshot file in another manner. This is not specifically limited in this embodiment of this application.

The first modification trace quantity is a modification trace quantity of the system file the virtual machine in the state in which the loading of the page content is completed, relative to the system file of the virtual machine in the initiating state, and the initiating state of the virtual machine is an initialization secure environment, that is, the first modification trace quantity is generated by the virtual machine by loading the page content. Therefore, the security level of the page content may be determined based on the first modification trace quantity.

When the terminal determines the security level of the page content based on the first modification trace quantity, the terminal may separately compare the first modification trace quantity with a first threshold and a second threshold. When the first modification trace quantity is greater than or equal to the first threshold, the terminal determines that the security level of the page content is malicious; when the first modification trace quantity is less than the first threshold and greater than or equal to the second threshold, the terminal determines that the security level of the page content is risky; or when the first modification trace quantity is less than the second threshold, the terminal determines that the security level of the page content is secure.

It should be noted that, both the first threshold and the second threshold may be preset on the terminal, and the first threshold is greater than the second threshold. For example, the first threshold may be 5, 10, or the like, and the second threshold may be 3, 5, or the like. This is not specifically limited in this embodiment of this application.

It should be noted that, step 204 may be performed after step 203, or may be performed after step 205, that is, a time sequence for performing step 204 is not specifically limited in this embodiment of this application.

Step 205: The terminal runs, by using the virtual machine, an application program linked to the page content, and copies a system file of the virtual machine in a state in which the application program is being run, to obtain a third system snapshot file.

Specifically, the terminal obtains a link in the page content by using the virtual machine, and downloads an installation file of the application program by using the virtual machine; based on the installation file, the terminal installs the application program by using the virtual machine, and runs the application program after completing the installation of the application program; and then, the terminal may invoke the system snapshot tool, copy, by using the system snapshot tool, the system file of the virtual machine in the state in which the application program is being run, and determine, as the third system snapshot file, the system file of the virtual machine in the state in which the application program is being run.

It should be noted that, when obtaining the link in the page content by using the virtual machine, the terminal may obtain the link in the page content by using a specified script, or certainly may obtain the link in the page content in another manner in actual application. This is not specifically limited in this embodiment of this application.

The application program is an application or a program that may be installed and run on the terminal, and the application program may be an audio playing application program, or may be an office application program, such as Office 2010 or WPS. This is not specifically limited in this embodiment of this application.

In an implementation, an operation of using, by the terminal, the virtual machine to run the application program linked to the page content, and copying the system file of the virtual machine in the state in which the application program is being run may be: the terminal sends a running command to the virtual machine; when receiving the running command, the virtual machine runs the application program linked to the page content; after the virtual machine runs the application program, the virtual machine may send running completion indication information to the terminal, where the running completion indication information is used for indicating that the virtual machine already completes the running of the application program linked to the page content; when receiving the running completion indication information, the terminal may send a copying command to the virtual machine; when receiving the copying command, the virtual machine copies the system file of the virtual machine in a state in which the running of the application program is completed, to obtain the third system snapshot file, and sends the third system snapshot file to the terminal.

In addition, when the system file includes a registry, a process, and a file, the third system snapshot file is a dataset of a registry, a process, and a file of a system of the virtual machine in the state in which the application program is being run. When the system file further includes other data, the third system snapshot file is a dataset of a registry, a process, a file, and other data of a system of the virtual machine in the state in which the application program is being run. This is not specifically limited in this embodiment of this application.

It should be noted that, the third system snapshot file may be stored in a local disk in a form of a .log file, or certainly may be stored in a form of another file in actual application. This is not specifically limited in this embodiment of this application.

It should be noted that, in this embodiment of this application, to increase efficiency of determining the security level of the application program, before copying the system file of the virtual machine in the state in which the application program is being run, the terminal may further perform the following steps (1) to (3), including:

(1) Capture, in a process of installing the application program, a first installation interface picture of the application program by using the virtual machine.

When capturing the first installation interface picture of the application program by using the virtual machine, the terminal may capture the first installation interface picture of the application program by using a specified script, or certainly may capture the first installation interface picture of the application program in another manner in actual application. This is not specifically limited in this embodiment of this application.

It should be noted that, a process for installing the application program generally includes a plurality of steps, and therefore the first installation interface picture captured in step (1) generally includes a plurality of installation interface pictures, where the plurality of installation interface pictures corresponds one-to-one to the plurality of steps.

(2) Determine a similarity degree between the first installation interface picture and a pre-stored second installation interface picture of the application program by using the virtual machine, where the second installation interface picture is an installation interface picture when the application program is in a secure state.

When the terminal determines the similarity degree between the first installation interface picture and the pre-stored second installation interface picture of the application program by using the virtual machine, the terminal may determine the similarity degree between the first installation interface picture and the pre-stored second installation interface picture of the application program by using the virtual machine and by utilizing a perceptual hash algorithm.

It should be noted that, in this embodiment of this application, descriptions are provided by using an example in which the terminal may determine the similarity degree between the first installation interface picture and the pre-stored second installation interface picture of the application program by using the virtual machine and by utilizing a perceptual hash algorithm, or in actual application, the terminal may determine the similarity degree by using another algorithm. This is not specifically limited in this embodiment of this application.

In addition, when the first installation interface picture includes a plurality of installation interface pictures, the second installation interface picture is an installation interface picture when the application program is in the secure state. Therefore, the second installation interface picture may also include a plurality of installation interface pictures. Then, when the terminal determines the similarity degree between the first installation interface picture and the pre-stored second installation interface picture of the application program by using the virtual machine, the terminal may determine, by using the virtual machine, a similarity degree between each installation interface picture included in the first installation interface picture and an installation interface picture corresponding to the pre-stored second installation interface picture, to obtain a plurality of similarity degrees, determine an average value of the plurality of similarity degrees, and determine the average value as the similarity degree between the first installation interface picture and the pre-stored second installation interface picture of the application program.

It should be noted that, in this embodiment of this application, descriptions are provided by using, as an example, only a method for determining the similarity degree between the first installation interface picture and the pre-stored second installation interface picture of the application program, or certainly, in actual application, the similarity degree may be determined in another manner, for example, determined by using weight values of the plurality of similarity degrees. This is not specifically limited in this embodiment of this application.

(3) When the determined similarity degree is greater than a similarity degree threshold, determine that the application program is a secure application program, and perform the step of copying a system file of the virtual machine in the state in which the application program is being run.

The similarity degree threshold may be customized by the user according to an actual requirement, or may be set by the terminal by default. This is not specifically limited in this embodiment of this application.

In actual application, in another embodiment, before copying the system file of the virtual machine in the state in which the application program is being run, the terminal may not perform the operations in steps (1) to (3), but directly copy the system file of the virtual machine in the state in which the application program is being run. This is not specifically limited in this embodiment of this application.

Step 206: The terminal determines a security level of the application program based on the first system snapshot file and the third system snapshot file.

Specifically, the terminal may determine a second modification trace quantity based on the first system snapshot file and the third system snapshot file, where the second modification trace quantity is a modification trace quantity of the third system snapshot file relative to the first system snapshot file, and determine the security level of the application program based on the second modification trace quantity.

An operation of determining, by the terminal, the second modification trace quantity based on the first system snapshot file and the third system snapshot file may be: the terminal invokes the system snapshot tool, and compares the first system snapshot file with the third system snapshot file by using the system snapshot tool, to determine the second modification trace quantity.

It should be noted that, in this embodiment of this application, descriptions are provided by using only an example in which the terminal invokes the system snapshot tool, and compares the first system snapshot file with the third system snapshot file by using the system snapshot tool; or certainly, in actual application, the terminal may compare the first system snapshot file with the third system snapshot file in another manner. This is not specifically limited in this embodiment of this application.

The second modification trace quantity is a modification trace quantity of the system file the virtual machine in the state in which the application program is being run, relative to the system file of the virtual machine in the initiating state, and the initiating state of the virtual machine is an initialization secure environment, that is, the second modification trace quantity is generated by the virtual machine by running the application program. Therefore, the security level of the application program may be determined based on the second modification trace quantity.

When the terminal determines the security level of the application program based on the second modification trace quantity, the terminal may separately compare the second modification trace quantity with a third threshold and compare the second modification trace quantity with a fourth threshold. When the second modification trace quantity is greater than or equal to the third threshold, the terminal determines that the security level of the application program is malicious; when the second modification trace quantity is less than the third threshold and greater than or equal to the fourth threshold, the terminal determines that the security level of the application program is risky; or when the second modification trace quantity is less than the fourth threshold, the terminal determines that the security level of the application program is secure.

It should be noted that, both the third threshold and the fourth threshold may be preset on the terminal, and the third threshold is greater than the fourth threshold. For example, the third threshold may be 10, 15, or the like, and the fourth threshold may be 5, 8, or the like. This is not specifically limited in this embodiment of this application.

Step 207: The terminal performs malicious URL detection on the target URL based on the security level of the page content and the security level of the application program.

Specifically, when both the security level of the page content and the security level of the application program are secure, it is determined that the target URL is a secure URL; when at least one of the security level of the page content or the security level of the application program is risky, it is determined that the target URL is risky; or when at least one of the security level of the page content or the security level of the application program is malicious, it is determined that the target URL is a malicious URL.

For example, referring to Table 1, when both the security level of the page content and the security level of the application program are secure, it is determined that the target URL is a secure URL; when at least one of the security level of the page content or the security level of the application program is risky, that is, no matter whether the security level of the page content is risky or the security level of the application program is risky, or both the security level of the page content and the security level of the application program are risky, it is determined that the target URL is risky; or when at least one of the security level of the page content or the security level of the application program is malicious, that is, no matter whether the security level of the page content is malicious or the security level of the application program is malicious, or both the security level of the page content and the security level of the application program are malicious, it is determined that the target URL is a malicious URL.

TABLE 1

| Security level of the target URL | Security level of the page content | Security level of the application program |
| --- | --- | --- |
| Secure | Secure | Secure |
| Risky | Secure | Risky |
| Malicious | Secure | Malicious |
| Risky | Risky | Secure |
| Risky | Risky | Risky |
| Malicious | Risky | Malicious |
| Malicious | Malicious | Secure |
| Malicious | Malicious | Risky |
| Malicious | Malicious | Malicious |

It should be noted that, in this embodiment of this application, after the terminal loads, in the initiating state, the page content of the to-be-detected target URL by using the virtual machine, and runs, by using the virtual machine, the application program linked to the page content, that is, from the initiating state to the running of the application program linked to the page content, the terminal may be in a plurality of different states, for example, the initiating state, the state in which the loading of the page content is completed, and the state in which the application program linked to the page content is being run that are mentioned in the foregoing steps. Therefore, the terminal may perform malicious URL detection on the target URL by using a system snapshot file of the virtual machine in each different state.

However, in the foregoing, descriptions are provided by using only an example in which the first system snapshot file, the second system snapshot file, and the third system snapshot file are used as system snapshot files of the virtual machine in the different states, that is, the descriptions are provided by using only the initiating state, the state in which the loading of the page content is completed, and the state in which the application program linked to the page content is being run as an example; in actual application, the terminal may further obtain a system snapshot file of the virtual machine in another state, and perform malicious URL detection on the target URL.

Certainly, generally the static analysis may be performed on the page content, to detect whether the page content includes a malicious behavior. Therefore, in this embodiment of this application, the terminal may also perform the static analysis on the page content, and perform a dynamic analysis on a malicious behavior of the application program in the page content by using the first system snapshot file and the third system snapshot file, that is, perform malicious URL detection on the target URL by combining two manners: the static analysis and the dynamic analysis.

That is, in this embodiment of this application, there may be a plurality of methods for performing malicious detection on the target URL based on the system snapshot file of the virtual machine in each different state. This is not listed one by one in this embodiment of this application.

Figure 2B:
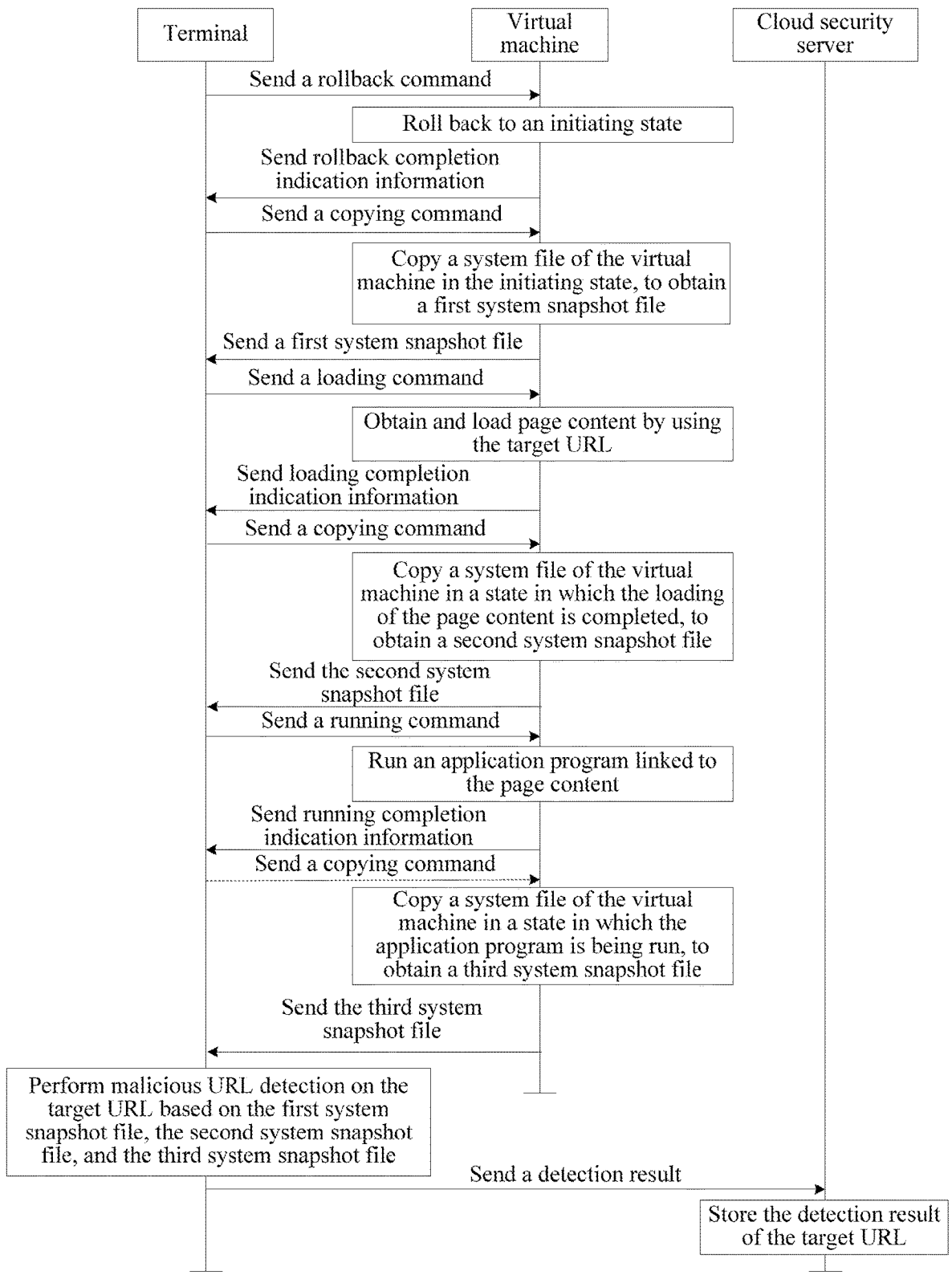
FIG. 2B is an interaction flowchart of malicious URL detection according to an exemplary embodiment.

In an implementation, after the terminal performs malicious URL detection on the target URL, the terminal may further send a detection result to a cloud security server, and the cloud security server stores the detection result of the target URL. Referring to FIG. 2B, FIG. 2B shows an interaction procedure of malicious URL detection performed between a terminal, a virtual machine, and a cloud security server.

In this embodiment of this application, the first system snapshot file is a system file of the virtual machine in the initialization secure environment, the second system snapshot file is a system file of the virtual machine after the page content of the to-be-detected target URL is loaded, and the third system snapshot file is obtained by the terminal by using the virtual machine to run the application program linked to the page content and then copying the system file of the virtual machine in the state in which the application program is being run. That is, the terminal uses the virtual machine to run the application program linked to the page content, to determine whether the application program generates a malicious behavior when being run, but does not simply perform a static analysis on page content of a target web page when the application program is not run, thereby increasing malicious URL determining accuracy. In addition, a virtual system of the virtual machine is isolated from the operating system of the terminal on which the virtual machine is currently located. Therefore, running the application program by using the virtual machine does not affect the operating system of the terminal when the application program is malicious, thereby reducing a probability that the terminal is attacked.

Figure 3:
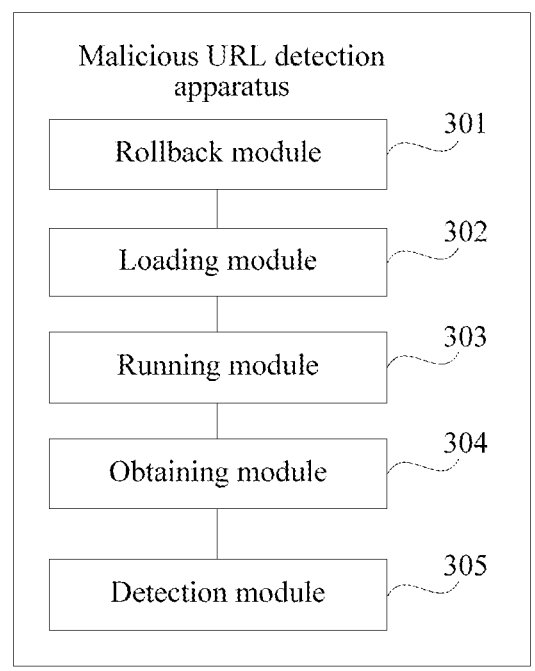
FIG. 3 is a schematic structural diagram of a malicious URL detection apparatus according to an exemplary embodiment.

FIG. 3 is a schematic structural diagram of a malicious URL detection apparatus according to an exemplary embodiment. Referring to FIG. 3, the malicious URL detection apparatus may include:

a rollback module 301, configured to roll back a virtual machine to an initiating state when detecting a trigger event of the virtual machine;

a loading module 302, configured to load, in the initiating state of the virtual machine, page content of a to-be-detected target URL by using the virtual machine;

a running module 303, configured to: after loading the page content, run, by using the virtual machine, an application program linked to the page content;

an obtaining module 304, configured to obtain a system snapshot file of the virtual machine in at least one state of the initiating state, a state in which the loading of the page content is completed, or a state in which the application program is being run; and a detection module 305, configured to perform malicious URL detection on the target URL based on the obtained system snapshot file.

Figure 4:
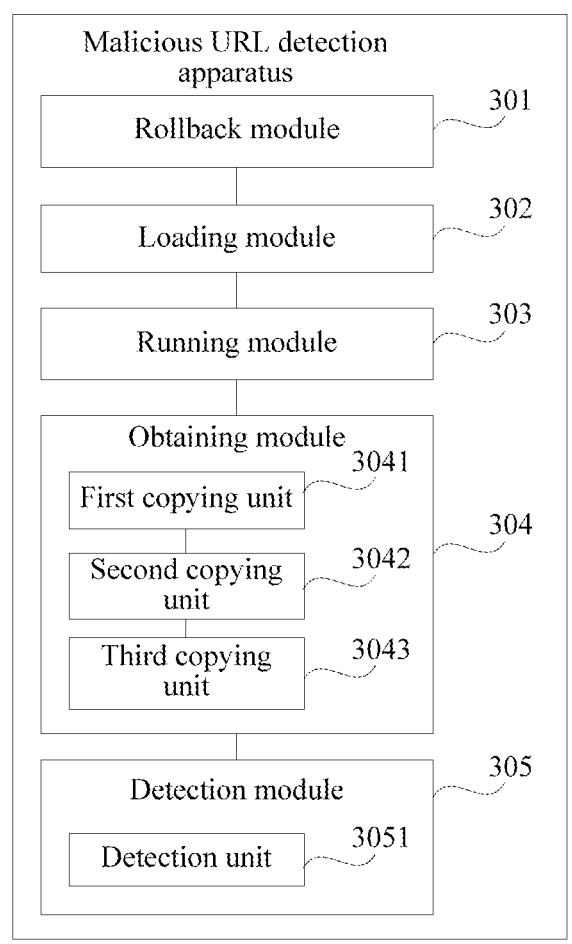
FIG. 4 is a schematic structural diagram of a malicious URL detection apparatus according to an exemplary embodiment.

Referring to FIG. 4, the obtaining module 304 may include:

a first copying unit 3041, configured to copy the system file of the virtual machine in the initiating state, to obtain the first system snapshot file;

a second copying unit 3042, configured to copy a system file of the virtual machine in the state in which the loading of the page content is completed, to obtain a second system snapshot file; and a third copying unit 3043, configured to copy a system file of the virtual machine in the state in which the application program is being run, to obtain a third system snapshot file.

Correspondingly, the detection module 305 may include:

a detection unit 3051, configured to perform malicious URL detection on the target URL based on the first system snapshot file, the second system snapshot file, and the third system snapshot file.

The detection unit 3051 may further include:

a first determining subunit, configured to determine a security level of the page content based on the first system snapshot file and the second system snapshot file;

a second determining subunit, configured to determine a security level of the application program based on the first system snapshot file and the third system snapshot file; and a detection subunit, configured to perform malicious URL detection on the target URL based on the security level of the page content and the security level of the application program.

The first determining subunit is configured to:

determine a first modification trace quantity based on the first system snapshot file and the second system snapshot file, where the first modification trace quantity is a modification trace quantity of the second system snapshot file relative to the first system snapshot file; and when the first modification trace quantity is greater than or equal to a first threshold, determine that the security level of the page content is malicious;

when the first modification trace quantity is less than the first threshold and greater than or equal to a second threshold, determine that the security level of the page content is risky; or when the first modification trace quantity is less than the second threshold, determine that the security level of the page content is secure.

The second determining subunit is configured to:

determine a second modification trace quantity based on the first system snapshot file and the third system snapshot file, where the second modification trace quantity is a modification trace quantity of the third system snapshot file relative to the first system snapshot file; and when the second modification trace quantity is greater than or equal to a third threshold, determine that the security level of the application program is malicious;

when the second modification trace quantity is less than the third threshold and greater than or equal to a fourth threshold, determine that the security level of the application program is risky; or when the second modification trace quantity is less than the fourth threshold, determine that the security level of the application program is secure.

The detection subunit is configured to:

when both the security level of the page content and the security level of the application program are secure, determine that the target URL is a secure URL;

when at least one of the security level of the page content or the security level of the application program is risky, determine that the target URL is risky; or when at least one of the security level of the page content or the security level of the application program is malicious, determine that the target URL is a malicious URL.

The running module 303 may include:

a downloading unit, configured to download an installation file of the application program based on a link in the page content by using the virtual machine;

an installation unit, configured to install the application program based on the installation file by using the virtual machine; and a running unit, configured to: after the installation of the application program is completed, run the application program.

The apparatus further may include:

a capturing module, configured to capture, in a process of installing the application program, a first installation interface picture of the application program by using the virtual machine;

a first determining module, configured to determine a similarity degree between the first installation interface picture and a pre-stored second installation interface picture of the application program by using the virtual machine, where the second installation interface picture is an installation interface picture when the application program is in a secure state; and a second determining module, configured to: when the determined similarity degree is greater than a similarity degree threshold, determine that the application program is a secure application program, and copy a system file of the virtual machine in the state in which the application program is being run.

The first system snapshot file, the second system snapshot file, and the third system snapshot file are all obtained by copying the system file of the virtual machine by using a system snapshot tool.

It should be noted that division of the foregoing functional modules is only described for exemplary purposes when the malicious URL detection apparatus provided in the foregoing embodiment implements the malicious URL detection method. In an actual application, the foregoing functions may be allocated to be accomplished by different functional modules according to requirements, that is, the internal structure of the terminal is divided into different functional modules, to accomplish all or a part of functions of the above described functions. In addition, the malicious URL detection apparatuses provided by the foregoing embodiment are based on the same concept as the malicious URL detection methods in the foregoing embodiments. For the specific implementation process, refer to the method embodiments, and the details are not described herein again.

In another implementation, the malicious URL detection apparatus may include a processor and a memory (not shown in the figure).

The memory stores an instruction that can be stored by the processor, and when executing the instruction, the processor is configured to perform functions of the rollback module 301, the loading module 302, the running module 303, the obtaining module 304, and the detection module 305 in the embodiment shown in FIG. 4. Details are not described herein again. When executing the instruction, the processor may be further configured to perform functions of the capturing module, the first determining module, and the second determining module. Details are not described herein again.

Figure 5:
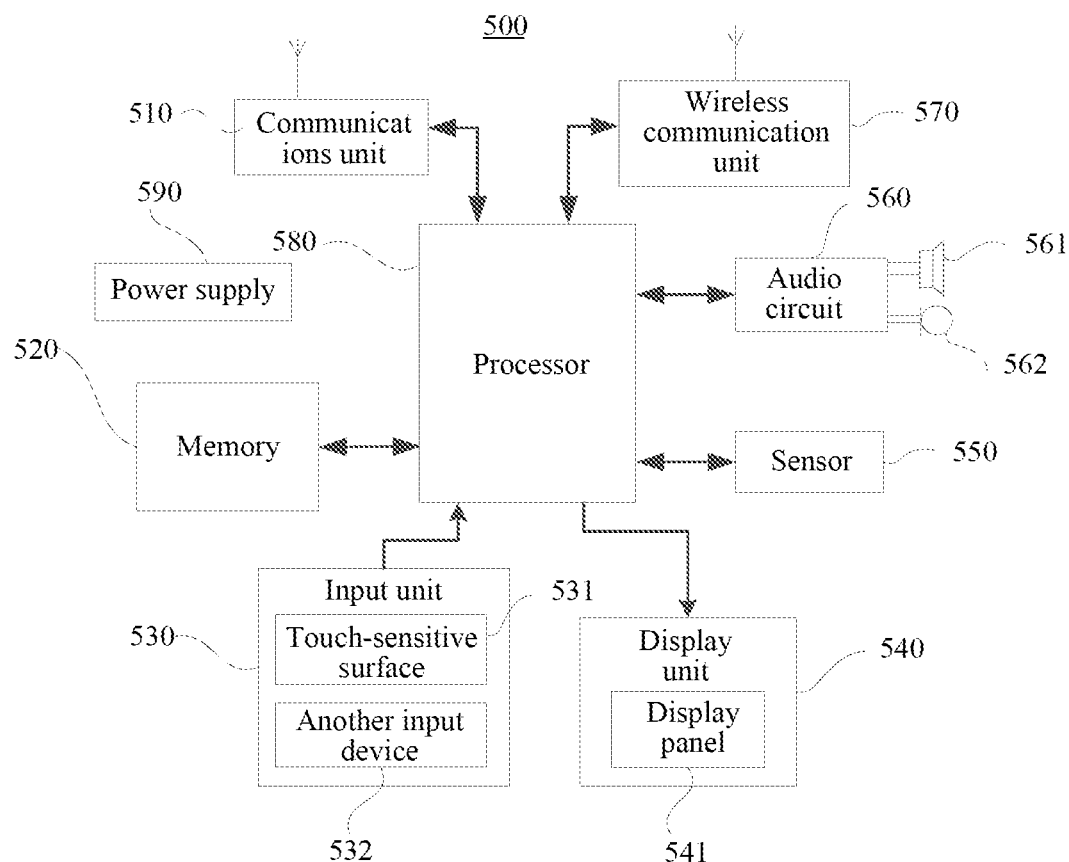
FIG. 5 is a schematic structural diagram of a terminal of a malicious URL detection apparatus according to an exemplary embodiment.

FIG. 5 is a schematic structural diagram of a terminal of a malicious URL detection apparatus according to an exemplary embodiment. Referring to FIG. 5, the terminal 500 may include a communications unit 510, a memory 520 including one or more computer readable storage media, an input unit 530, a display unit 540, a sensor 550, an audio circuit 560, a Wireless Fidelity (WiFi) unit 570, a processor 580 including one or more processing cores, a power supply 590, and the like. A person skilled in the art may understand that the structure of the terminal shown in FIG. 5 does not constitute a limitation to the terminal, and the terminal may include more components or fewer components than those shown in the figure, or some components may be combined, or a different component deployment may be used.

The communications unit 510 may be configured to receive and send signals during an information receiving and sending process or a call process. The communications unit 510 may be a network communications device, such as a radio frequency (RF) circuit, a router, or a modem. Particularly, when the communications unit 510 is the RF circuit, the communications unit 510 receives downlink information of a base station, and then hands over the downlink information to one or more processors 580 for processing. In addition, the communications unit 1310 sends related uplink data to the base station. Generally, the RF circuit as the communications unit may include, but is not limited to, an antenna, at least one amplifier, a tuner, one or more oscillators, a subscriber identity module (SIM) card, a transceiver, a coupler, a low noise amplifier (LNA), a duplexer, and the like. In addition, the communications unit 510 may further communicate with a network and other devices through wireless communication. The wireless communication may use any communication standard or protocol, including but not limited to Global System for Mobile communications (GSM), General Packet Radio Service (GPRS), Code Division Multiple Access (CDMA), Wideband Code Division Multiple Access (WCDMA), Long Term Evolution (LTE), email, Short Messaging Service (SMS), or the like. The memory 520 may be configured to store a software program and module. The processor 580 runs the software program and module stored in the memory 520, to implement various functional applications and data processing. The memory 520 may mainly include a program storage area and a data storage area. The program storage area may store an operating system, an application program required by at least one function (such as a sound playback function and an image display function), and the like. The data storage area may store data (such as audio data and an address book) created according to use of the terminal 500, and the like. In addition, the memory 520 may include a high speed random access memory, and may also include a non-volatile memory, such as at least one magnetic disk storage device, a flash memory, or another volatile solid-state storage device. Correspondingly, the memory 520 may further include a memory controller, so as to provide access of the processor 580 and the input unit 530 to the memory 520.

The input unit 530 may be configured to receive input digit or character information, and generate a keyboard, mouse, joystick, optical, or track ball signal input related to the user setting and function control. The input unit 530 may include a touch-sensitive surface 531 and another input device 532. The touch-sensitive surface 531, which may also be referred to as a touchscreen or a touch panel, may collect a touch operation of a user on or near the touch-sensitive surface (such as an operation of a user on or near the touch-sensitive surface 531 by using any suitable object or accessory, such as a finger or a stylus), and drive a corresponding connection apparatus according to a preset program. The touch-sensitive surface 531 may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and sends the touch point coordinates to the processor 580. Moreover, the touch controller can receive and execute a command sent from the processor 580. In addition, the touch-sensitive surface 531 may be a resistive, capacitive, infrared, or surface sound wave type touch-sensitive surface. In addition to the touch-sensitive surface 531, the input unit 530 may further include the another input device 532. The another input device 532 may include, but is not limited to, one or more of a physical keyboard, a functional key (such as a volume control key and a switch key), a track ball, a mouse, and a joystick.

The display unit 540 may be configured to display information input by the user or information provided for the user, and various graphical user interfaces of the terminal 500. The graphical user interfaces may be composed of graphics, text, icons, videos, and any combination thereof. The display unit 540 may include a display panel 541. The display panel 541 may be configured by using a liquid crystal display (LCD), an organic light-emitting diode (OLED), or the like. Further, the touch-sensitive surface 531 may cover the display panel 541. After detecting a touch operation on or near the touch-sensitive surface 531, the touch-sensitive surface 531 transfers the touch operation to the processor 580, to determine the type of the touch event. Then, the processor 580 provides a corresponding visual output on the display panel 541 according to the type of the touch event. Although, in FIG. 5, the touch-sensitive surface 531 and the display panel 541 are used as two separate components to implement input and output functions, in some embodiments, the touch-sensitive surface 531 and the display panel 541 may be integrated to implement the input and output functions.

The terminal 500 may further include at least one sensor 550 such as an optical sensor, a motion sensor, and other sensors. The optical sensor may include an ambient light sensor and a proximity sensor, where the ambient light sensor may adjust luminance of the display panel 541 according to the luminance of the ambient light, and the proximity sensor may switch off the display panel 541 and/or backlight when the terminal 500 is moved to the ear. As one type of the motion sensor, a gravity acceleration sensor may detect a value of acceleration at each direction (which generally is triaxial), may detect a value and a direction of the gravity when being static, and may be configured to identify an application of a mobile phone gesture (such as a handover between horizontal and longitudinal screens, a related game, and gesture calibration of a magnetometer), a related function of vibration identification (such as a pedometer and a knock), and the like. Another sensor, such as a gyroscope, a barometer, a hygrometer, a thermometer, and an infrared sensor, which may be configured in the terminal 500 is not described herein again.

The audio circuit 560, a speaker 561, and a microphone 562 may provide audio interfaces between the user and the terminal 500. The audio circuit 560 may transmit, to the speaker 561, an electric signal that is converted from received audio data. The speaker 561 converts the electric signal into a voice signal for outputting. On the other hand, the microphone 562 converts a collected voice signal into an electric signal. The audio circuit 560 receives the electric signal and converts it into audio data, and outputs the audio data to the processor 580 for processing. Then the processor 580 sends the audio data to another terminal by using the communications unit 510, or outputs the audio data to the memory 520 for further processing. The audio circuit 560 may further include an earplug jack, to provide communication between a peripheral earphone and the terminal 500.

To implement wireless communication, the terminal device may be configured with a wireless communications unit 570, where the wireless communications unit 570 may be a WiFi module. WiFi belongs to the short distance wireless transmission technology. The terminal 500 may help, by using the wireless communications unit 570, a user to receive and send an email, browse a web page, and access stream media, and the like, which provides wireless broadband Internet access for the user. Although the wireless communications unit 570 is shown in the figure, it may be understood that, the wireless communications unit does not belong to a necessary constitution of the terminal 500, and may be omitted within the scope of the essence of the present disclosure according to requirements.

The processor 580 is a control center of the terminal 500, which is connected to various parts of the entire mobile phone by using various interfaces and lines, and by running or executing a software program and/or module stored in the memory 520 and calling data stored in the memory 520, to perform various functions of the terminal 500 and process data, so as to perform overall monitoring on the mobile phone. The processor 580 may include one or more processing cores. The processor 580 may integrate an application processor and a modem. The application processor mainly processes an operating system, a user interface, an application program, and the like. The modem mainly processes wireless communication. It may be understood that the foregoing modem may either not be integrated into the processor 580.

The terminal 500 further may include the power supply 590 (such as a battery) for supplying power to the components. The power supply may be logically connected to the processor 580 by using a power management system, thereby implementing functions such as charging, discharging, and power consumption management by using the power management system. The power supply 590 may further include one or more of a direct current or alternating current power supply, a re-charging system, a power failure detection circuit, a power supply converter or inverter, a power supply state indicator, and any other components.

Although not shown in the figure, the terminal 500 may further include a camera, a Bluetooth module, and the like, which are not described herein.

The memory 520 further may include one or more programs. The one or more programs are stored in the memory 520. The one or more programs include instructions used for performing malicious URL detection method provided in the embodiments of this application, including:

rolling back a virtual machine to an initiating state when detecting a trigger event of the virtual machine;

loading, in the initiating state of the virtual machine, page content of a to-be-detected target URL by using the virtual machine;

after loading the page content, running, by using the virtual machine, an application program linked to the page content;

obtaining a system snapshot file of the virtual machine in at least one state of the initiating state, a state in which the loading of the page content is completed, or a state in which the application program is being run; and performing malicious URL detection on the target URL based on the obtained system snapshot file.

The obtaining a system snapshot file of the virtual machine in at least one state of the initiating state, a state in which the loading of the page content is completed, or a state in which the application program is being run may include:

copying a system file of the virtual machine in the initiating state, to obtain a first system snapshot file;

copying a system file of the virtual machine in a state in which the loading of the page content is completed, to obtain a second system snapshot file; and copying a system file of the virtual machine in the state in which the application program is being run, to obtain a third system snapshot file.

Correspondingly, the performing malicious URL detection on the target URL based on the obtained system snapshot file may include:

performing malicious URL detection on the target URL based on the first system snapshot file, the second system snapshot file, and the third system snapshot file.

The performing malicious URL detection on the target URL based on the first system snapshot file, the second system snapshot file, and the third system snapshot file may include:

determining a security level of the page content based on the first system snapshot file and the second system snapshot file;

determining a security level of the application program based on the first system snapshot file and the third system snapshot file; and performing malicious URL detection on the target URL based on the security level of the page content and the security level of the application program.

The determining a security level of the page content based on the first system snapshot file and the second system snapshot file may include:

determining a first modification trace quantity based on the first system snapshot file and the second system snapshot file, where the first modification trace quantity is a modification trace quantity of the second system snapshot file relative to the first system snapshot file; and when the first modification trace quantity is greater than or equal to a first threshold, determining that the security level of the page content is malicious;

when the first modification trace quantity is less than the first threshold and greater than or equal to a second threshold, determining that the security level of the page content is risky; or when the first modification trace quantity is less than the second threshold, determining that the security level of the page content is secure.

The determining a security level of the application program based on the first system snapshot file and the third system snapshot file may include:

determining a second modification trace quantity based on the first system snapshot file and the third system snapshot file, where the second modification trace quantity is a modification trace quantity of the third system snapshot file relative to the first system snapshot file; and when the second modification trace quantity is greater than or equal to a third threshold, determining that the security level of the application program is malicious;

when the second modification trace quantity is less than the third threshold and greater than or equal to a fourth threshold, determining that the security level of the application program is risky; or when the second modification trace quantity is less than the fourth threshold, determining that the security level of the application program is secure.

The performing malicious URL detection on the target URL based on the security level of the page content and the security level of the application program may include:

when both the security level of the page content and the security level of the application program are secure, determining that the target URL is a secure URL;

when at least one of the security level of the page content or the security level of the application program is risky, determining that the target URL is risky; or when at least one of the security level of the page content or the security level of the application program is malicious, determining that the target URL is a malicious URL.

The running, by using the virtual machine, an application program linked to the page content may include:

downloading an installation file of the application program based on a link in the page content by using the virtual machine;

installing the application program based on the installation file by using the virtual machine; and after the installation of the application program is completed, running the application program.

Before the copying a system file of the virtual machine in the state in which the application program is being run, the method further may include:

capturing, in a process of installing the application program, a first installation interface picture of the application program by using the virtual machine;

determining a similarity degree between the first installation interface picture and a pre-stored second installation interface picture of the application program by using the virtual machine, where the second installation interface picture is an installation interface picture when the application program is in a secure state; and when the similarity degree is greater than a similarity degree threshold, determining that the application program is a secure application program, and performing the step of copying a system file of the virtual machine in the state in which the application program is being run.

The first system snapshot file, the second system snapshot file, and the third system snapshot file are all obtained by copying the system file of the virtual machine by using a system snapshot tool.

In this embodiment of this application, the terminal may roll back the virtual machine to the initiating state, load the page content of the to-be-detected target URL in the initiating state, run the application program linked to the page content, and perform malicious URL detection by using the system snapshot file of the virtual machine in at least one state of the initiating state, the state in which the loading of the page content is completed, or the state in which the application program is being run. That is, the terminal runs, by using the virtual machine, the application program linked to the page content, to determine whether the application program generates a malicious behavior when being run, but does not simply perform a static analysis on page content of a target web page when the application program is not run, thereby increasing malicious URL determining accuracy. In addition, a virtual system of the virtual machine is isolated from the operating system of the terminal on which the virtual machine is currently located. Therefore, running the application program by using the virtual machine does not affect the operating system of the terminal when the application program is malicious, thereby reducing a probability that the terminal is attacked.

A person of ordinary skill in the art may understand that all or some of the steps of the foregoing embodiments may be implemented by using hardware, or may be implemented by a program instructing relevant hardware. The program may be stored in a computer readable storage medium. The above-mentioned storage medium may be a read-only memory, a magnetic disk, an optical disc, or the like.

The foregoing descriptions are merely exemplary embodiments of this application, but are not intended to limit this application. Any modification, equivalent replacement, or improvement made within the spirit and principle of this application shall fall within the protection scope of this application and the appended claims.

What is claimed is:

1. A method comprising:
rolling back, by at least one processor, a virtual machine to an initiating state in response to detecting a trigger event of the virtual machine;
loading, in the initiating state by the at least one processor, page content of a target URL using the virtual machine;
running, using the virtual machine by the at least one processor, an application program linked to the page content;
obtaining, by the at least one processor, a first system file snapshot file by copying a system file of the virtual machine in the initiating state before loading the page content;
obtaining, by the at least one processor, a second system file snapshot file by copying a system file of the virtual machine in the state in which the loading of the page content is completed; and
obtaining, by the at least one processor, a third system file snapshot file by copying a system file of the virtual machine in the state in which the application program is being run;
determining, by the at least one processor, a security level of the page content based on a first comparison of the first system snapshot file and the second system snapshot file;
determining, by the at least one processor, a security level of the application program based on a second comparison of the first system snapshot file and the third system snapshot file; and
performing, by the at least one processor, malicious URL detection on the target URL based on the security level of the page content and the security level of the application program.

2. The method according to claim 1, wherein the determining the security level of the page content comprises:
determining, by the at least one processor, a first modification trace quantity based on the first system snapshot file and the second system snapshot file, the first modification trace quantity being a modification trace quantity of the second system snapshot file relative to the first system snapshot file; and
determining, by the at least one processor, the security level of the page content based on the first modification trace quantity.

3. The method according to claim 2, wherein:
in response to the first modification trace quantity being greater than or equal to a first threshold, determining that the security level of the page content is malicious;
in response to the first modification trace quantity being less than the first threshold and greater than or equal to a second threshold, determining that the security level of the page content is risky; and
in response to the first modification trace quantity being less than the second threshold, determining that the security level of the page content is secure.

4. The method according to claim 3, wherein the determining the security level of the application program comprises:
determining, by the at least one processor, a second modification trace quantity based on the first system snapshot file and the third system snapshot file, the second modification trace quantity being a modification trace quantity of the third system snapshot file relative to the first system snapshot file; and
determining, by the at least one processor, the security level of the application program based on the second modification trace quantity.

5. The method according to claim 4, wherein:
in response to the second modification trace quantity being greater than or equal to a third threshold, determining that the security level of the application program is malicious;
in response to the second modification trace quantity being less than the third threshold and greater than or equal to a fourth threshold, determining that the security level of the application program is risky; and
in response to the second modification trace quantity being less than the fourth threshold, determining that the security level of the application program is secure.

6. The method according to claim 5, wherein:
in response to both the security level of the page content and the security level of the application program being secure, determining that the target URL is a secure URL;
in response to at least one of the security level of the page content or the security level of the application program being risky, determining that the target URL is risky; and
in response to at least one of the security level of the page content or the security level of the application program is malicious, determining that the target URL is a malicious URL.

7. The method according to claim 1, wherein the determining the security level of the application program comprises:
determining, by the at least one processor, a modification trace quantity of the third system snapshot file relative to the first system snapshot file; and
determining, by the at least one processor, the security level of the application program based on the modification trace quantity.

8. The method according to claim 7, wherein:
in response to the modification trace quantity being greater than or equal to a third threshold, determining that the security level of the application program is malicious;
in response to the modification trace quantity being less than the third threshold and greater than or equal to a fourth threshold, determining that the security level of the application program is risky; and
in response to the modification trace quantity being less than the fourth threshold, determining that the security level of the application program is secure.

9. The method according to claim 1, wherein the copying the system file of the virtual machine in the state in which the application program is being run comprises:
capturing, by the at least one processor, in a process of installing the application program, a first installation interface picture of the application program using the virtual machine;
determining, by the at least one processor, a similarity degree between the first installation interface picture and a pre-stored second installation interface picture of the application program captured previously using the virtual machine, the pre-stored second installation interface picture is an installation interface picture captured at a time at which the application program was in a secure state; and only in response to the similarity degree being greater than a similarity degree threshold, determining that the application program is a secure application program and copying the system file of the virtual machine in the state in which the application program is being run.

10. An apparatus comprising:
at least one memory configured to store computer program code; and
at least one processor configured to access the at least one memory and operate according to the computer program code, the computer program code including:
roll back code configured to cause at least one of the at least one processor to roll back a virtual machine to an initiating state in response to detecting a trigger event of the virtual machine;
loading code configured to cause at least one of the at least one processor to load, in the initiating state, page content of a target URL using the virtual machine;
running code configured to cause at least one of the at least one processor to run, using the virtual machine, an application program linked to the page content;
obtaining code configured to cause at least one of the at least one processor to obtain a first system snapshot file by copying a system file of the virtual machine in the initiating state before the loading of the page content, to obtain a first system snapshot file; obtain a second system snapshot file by copying a system file of the virtual machine in the state in which the loading of the page content is completed, to obtain a second system snapshot file; and obtain a third system snapshot file by copying a system file of the virtual machine in the state in which the application program is being run, to obtain a third system snapshot file;
page security code configured to cause at least one of the at least one processor to determine a security level of the page content based on a first comparison of the first system snapshot file and the second system snapshot file;
application security code configured to cause at least one of the at least one processor to determine a security level of the application program based on a second comparison of the first system snapshot file and the third system snapshot file;
detection code configured to cause at least one of the at least one processor to perform malicious URL detection on the target URL based on the security level of the page content and the security level of the application program.

11. The apparatus according to claim 10, wherein the page security code is further configured to cause at least one of the at least one processor to:
determine a first modification trace quantity based on the first system snapshot file and the second system snapshot file, the first modification trace quantity being a modification trace quantity of the second system snapshot file relative to the first system snapshot file; and
determine the security level of the page content based on the first modification trace quantity.

12. The apparatus according to claim 11, wherein the page security code is further configured to cause at least one of the at least one processor to:

in response to the first modification trace quantity being greater than or equal to a first threshold, determining that the security level of the page content is malicious;
in response to the first modification trace quantity being less than the first threshold and greater than or equal to a second threshold, determining that the security level of the page content is risky; and
in response to the first modification trace quantity being less than the second threshold, determining that the security level of the page content is secure.

13. The apparatus according to claim 12, wherein the application security code is further configured to cause at least one of the at least one processor to:
determine a second modification trace quantity based on the first system snapshot file and the third system snapshot file, the second modification trace quantity being a modification trace quantity of the third system snapshot file relative to the first system snapshot file; and
determine the security level of the application program based on the second modification trace quantity.

14. The apparatus according to claim 13, wherein the application security code is further configured to cause at least one of the at least one processor to:
in response to the second modification trace quantity being greater than or equal to a third threshold, determining that the security level of the application program is malicious;
in response to the second modification trace quantity being less than the third threshold and greater than or equal to a fourth threshold, determining that the security level of the application program is risky; and
in response to the second modification trace quantity being less than the fourth threshold, determining that the security level of the application program is secure.

15. The apparatus according to claim 14, wherein the detection code is further configured to cause at least one of the at least one processor to:
in response to both the security level of the page content and the security level of the application program being secure, determining that the target URL is a secure URL;
in response to at least one of the security level of the page content or the security level of the application program being risky, determining that the target URL is risky; and
in response to at least one of the security level of the page content or the security level of the application program is malicious, determining that the target URL is a malicious URL.

16. The apparatus according to claim 10, wherein the application security code is further configured to cause at least one of the at least one processor to:
determine a modification trace quantity of the third system snapshot file relative to the first system snapshot file; and
determine the security level of the application program based on the modification trace quantity.

17. The apparatus according to claim 16, wherein the application security code is further configured to cause at least one of the at least one processor to:
in response to the modification trace quantity being greater than or equal to a third threshold, determining that the security level of the application program is malicious;
in response to the modification trace quantity being less than the third threshold and greater than or equal to a fourth threshold, determining that the security level of the application program is risky; and in response to the modification trace quantity being less than the fourth threshold, determining that the security level of the application program is secure.

18. The apparatus according to claim 10, wherein the obtaining code is configured to cause the at least one of the at least one processor to:

capture, in a process of installing the application program, a first installation interface picture of the application program using the virtual machine;

determine a similarity degree between the first installation interface picture and a pre-stored second installation interface picture of the application program captured previously using the virtual machine, the pre-stored second installation interface picture being an installation interface picture captured at a time at which the application program was in a secure state; and only in response to the similarity degree being greater than a similarity degree threshold, determine that the application program is a secure application program and copy the system file of the virtual machine in the state in which the application program is being run.

19. A non-transitory computer readable storage medium, storing a computer program which, when executed by a computer, performs operations including:

rolling back a virtual machine to an initiating state in response to detecting a trigger event of the virtual machine;

loading, in the initiating state, page content of a target URL using the virtual machine;

running, using the virtual machine, an application program linked to the page content;

obtaining a first system file snapshot file by copying a system file of the virtual machine in the initiating state before loading the page content;

obtaining a second system file snapshot file by copying a system file of the virtual machine in the state in which the loading of the page content is completed;

obtaining a third system file snapshot file by copying a system file of the virtual machine in the state in which the application program is being run;

determining a security level of the page content based on a first comparison of the first system snapshot file and the second system snapshot file;

determining a security level of the application program based on a second comparison of the first system snapshot file and the third system snapshot file; and performing malicious URL detection on the target URL based on the security level of the page content and the security level of the application program.

20. The non-transitory computer readable storage medium according to claim 19, wherein the determining the security level of the page content comprises:

determining a first modification trace quantity based on the first system snapshot file and the second system snapshot file, the first modification trace quantity being a modification trace quantity of the second system snapshot file relative to the first system snapshot file; and determining the security level of the page content based on the first modification trace quantity.

21. The non-transitory computer readable storage medium according to claim 20, wherein the determining the security level of the application program comprises:

determining a second modification trace quantity based on the first system snapshot file and the third system snapshot file, the second modification trace quantity being a modification trace quantity of the third system snapshot file relative to the first system snapshot file; and determining the security level of the application program based on the second modification trace quantity.

22. The non-transitory computer readable storage medium according to claim 19, wherein:

in response to both the security level of the page content and the security level of the application program being secure, determining that the target URL is a secure URL;

in response to at least one of the security level of the page content or the security level of the application program being risky, determining that the target URL is risky; and in response to at least one of the security level of the page content or the security level of the application program is malicious, determining that the target URL is a malicious URL.

23. The non-transitory computer readable storage medium according to claim 19, wherein the determining the security level of the application program comprises:

determining a modification trace quantity of the third system snapshot file relative to the first system snapshot file; and determining the security level of the application program based on the modification trace quantity.

24. The non-transitory computer readable storage medium according to claim 23, wherein:

in response to the modification trace quantity being greater than or equal to a third threshold, determining that the security level of the application program is malicious;

in response to the modification trace quantity being less than the third threshold and greater than or equal to a fourth threshold, determining that the security level of the application program is risky; and in response to the modification trace quantity being less than the fourth threshold, determining that the security level of the application program is secure.

25. The non-transitory computer readable storage medium according to claim 19, wherein the copying the system file of the virtual machine in the state in which the application program is being run comprises:

capturing in a process of installing the application program, a first installation interface picture of the application program using the virtual machine;

determining a similarity degree between the first installation interface picture and a pre-stored second installation interface picture of the application program captured previously using the virtual machine, the pre-stored second installation interface picture is an installation interface picture captured at a time at which the application program was in a secure state; and only in response to the similarity degree being greater than a similarity degree threshold, determining that the application program is a secure application program and copying the system file of the virtual machine in the state in which the application program is being run.

* * * * *